United States Patent [19]

Horton et al.

[11] Patent Number: 4,967,094

[45] Date of Patent: Oct. 30, 1990

[54] FILM DETECTION APPARATUS

[75] Inventors: Robert L. Horton; Richard J. Backus, both of Rochester, N.Y.

[73] Assignee: Eastman Kodak Company, Rochester, N.Y.

[21] Appl. No.: 305,832

[22] Filed: Feb. 2, 1989

[51] Int. Cl.[5] .............................................. G01N 21/86

[52] U.S. Cl. ...................................... 250/561; 250/571

[58] Field of Search ........................ 250/561, 226, 571; 354/298; 353/26 A; 355/41, 75

[56] References Cited

U.S. PATENT DOCUMENTS 3,435,243 3/1969 Webb .................................. 250/561

3,696,981 10/1972 Levy .................................. 250/561

4,167,678 9/1979 Mischo et al. ....................... 250/561

4,751,394 6/1988 Matsuoka et al. .................. 250/561

*Primary Examiner*—David C. Nelms

*Assistant Examiner*—George Beck

*Attorney, Agent, or Firm*—Roger A. Fields

[57] ABSTRACT

Apparatus for detecting the presence of processed photograph film at a particular location comprises a light source which emits green or blue light having a wavelength in the range of 420–600 nanometers. A light sensors positioned to receive light from the light source when the film is not present. An infrared filter and a filter for transmitting light in the range of wavelengths emitted by the light source are positioned in front of the light sensor.

12 Claims, 3 Drawing Sheets

22

11

10

14

32

12

28

18

30

11

26

24

FILM DETECTION APPARATUS

CROSS REFERENCE TO RELATED APPLICATIONS AND PATENTS

Reference is made to (1) commonly assigned U.S. Pat. No. 4,774,553 entitled FILM HANDLING MECHANISM issued Sept. 27, 1987 in the names of Douglass L. Blanding, Shaun M. Amos and Thomas C. Jessop: and (2) commonly assigned U.S. application Ser. No. 305,830 entitled FILM HANDLING MEANS FOR A PHOTOGRAPHIC PRINTER filed Feb. 2, 1989 in the name of Richard J. Backus. The disclosure of both the patent and application are incorporated herein by reference.

BACKGROUND OF THE INVENTION

1. Field of the Invention

This invention relates to detection apparatus and more specifically to apparatus for detecting the presence of processed photographic film in apparatus such as a film processor or printer.

2. Description of the Prior Art

In apparatus such as photographic printers, it is desirable to detect the presence of film in the film entrance slot of the printer. In the case of a minilab where the film is inserted by the customer, the film may be inserted in varying orientations. Also, the film may be curled in varying degrees and directions.

The prior art teaches the use of infrared detectors for detecting the presence of film in a film path. Such detectors typically operate in a beam interruption or beam reflection mode. In the beam interruption mode, the failure of an infrared light beam to reach a sensor indicates the presence of the film. In a beam reflection mode, the sensor senses the amount of infrared light reflected by the film.

Infrared detectors have disadvantages particularly when used in the reflective mode. In the reflective mode, the infrared detector is sensitive to the angle of the film relative to the sensor and to the amount of film curl. If the film is inserted by the customer, the angle is variable and uncontrolled. Also, if the negative is of low optical density, the infrared beam will pass through the film without detachable reflection.

In the case of a beam interruption mode, the accuracy of the detector will also be affected by the optical density, a low density allowing some of the beam light to pass through the film to the sensor to erroneously indicate that a film is not present.

SUMMARY OF THE INVENTION

It is an object of the present invention, to reliably detect the presence of processed photographic film at a particular location.

In accordance with the invention, a film detection apparatus comprises a light source which emits light at a wavelength that is strongly absorbed by the film, regardless of image density. In the case of negative photographic film such as KODACOLOR VR 35 mm films manufactured by Eastman Kodak Company, a green or blue light source is employed having a wavelength in the range of 420–600 nanometers because a dye in the film base strongly absorbs light having these wavelengths. With this light source, the sensor when used in a reflective or interrupt mode is substantially less affected by stray light and the inaccuracies described above in connection with the prior art. Also, low cost solid state light emitters that emit light in this range of wavelengths are commercially available and the invention thus results in a low cost solution to existing film detection inaccuracies.

BRIEF DESCRIPTION OF THE DRAWINGS

Other objects and advantages will become apparent from the following description taken in connection with the accompanying drawings wherein.

DETAILED DESCRIPTION OF THE INVENTION

Figure 1:
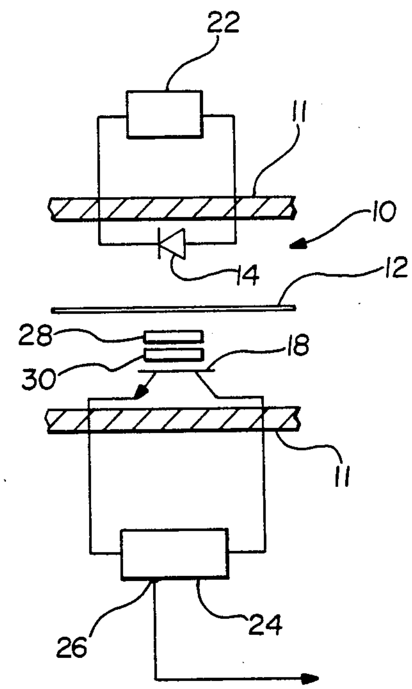
FIG. 1 is a schematic illustration of one embodiment of a film detecting apparatus in accordance with the invention.

Referring to FIG. 1, there is shown schematically a film path 10 defined by a pair of walls 11 adapted to receive a processed photographic film negative 12. The film path 10 may comprise the entrance chamber of a minilab where the customer inserts a negative to be printed into a slot of a film strip receiving means. Such apparatus is shown in more detail in the commonly assigned cross referenced application and patent. Since such minilabs are well known in the art and form no part of the present invention, the description will be directed only to the apparatus for detecting the presence of the film 12 in the film path 10.

In accordance with the invention, a light source 14 comprising a light emitting diode is supported on one of the walls 11 to direct a beam of light toward a light sensor 18 comprising a light sensitive transistor supported on the other wall 11 on the other side of the film. The light emitting diode 14 is coupled to a suitable power source 22 and the light sensitive transistor 18 is coupled to a suitable power source and control circuit 24 which respond to light induced current flow through the transistor 18 to generate an output signal at terminal 26 to indicate that film is not present in slot 10.

Figure 4:
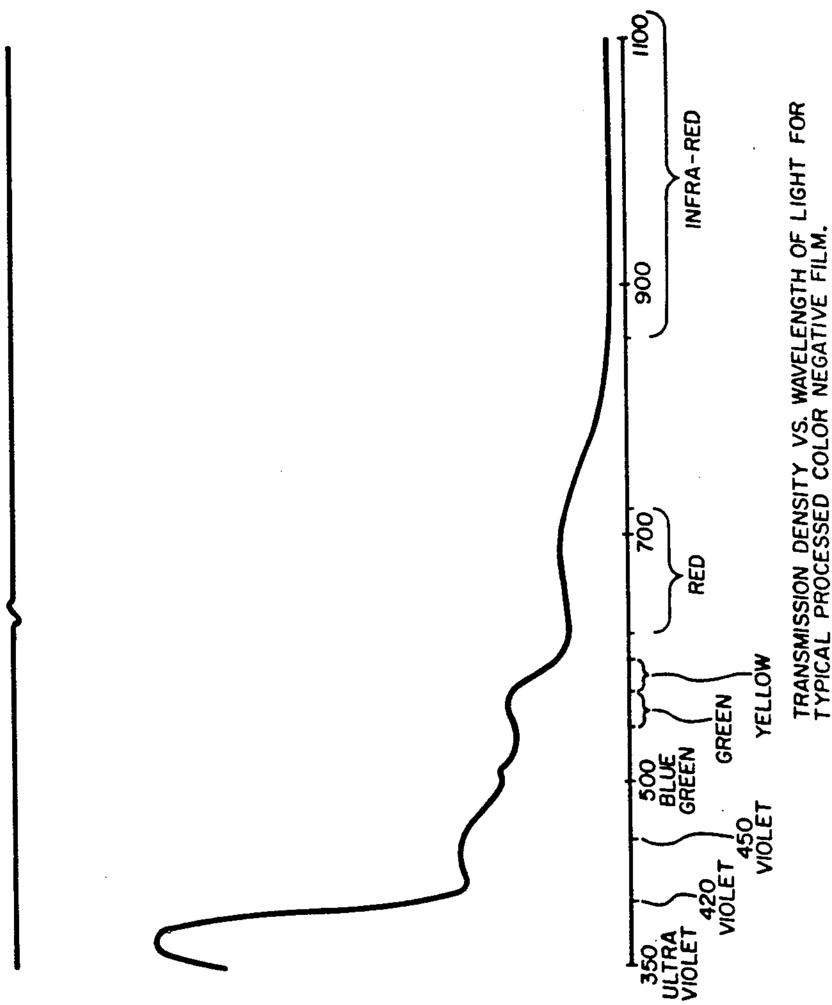
FIG. 4 is a graph of transmission density vs. wavelength for a typical 35 mm negative film such as KODAKCOLOR VR 35 mm film manufactured by Eastman Kodak Company.

In accordance with the invention, the light emitting diode 14 is selected to emit blue or green light having a wavelength in the range of 420–600 nanometers. As illustrated in FIG. 4, the transmission density of negative film is greater at these wavelengths then at higher wavelengths. Preferably green light is used because green light emitting diodes have a lower cost than blue ones. An infrared absorbing filter 28 and a Wratten filter 30, are positioned in front of the transistor 18. The Wratten filter 30 is selected to transmit light of the wavelength emitted by the diode 14, in this case green light. With this arrangement, infrared radiation is absorbed by the filter 28 and the transistor 18 only responds to green light.

In operation when a film 12 is not present in slot 10, the light emitting diode 14 will emit a green light beam which will be received by light sensitive transistor 18. The light induced current flow through transistor 18 will result in a binary 0 or 1 output being produced by controller 24 to indicate the absence of film. If a film strip is inserted in the path 10, the beam emitted by diode 14 will be interrupted by the film. Since the light beam is green, it will be strongly absorbed by the dye in the film base and substantially no light will reach the light sensitive transistor 18 regardless of the density of the filter film negative. Filters 28 and 30 will prevent extraneous light from reaching the light sensing diode 30. The apparatus thus provides reliable accurate film detection by means of a very simple low cost apparatus.

Figure 2:
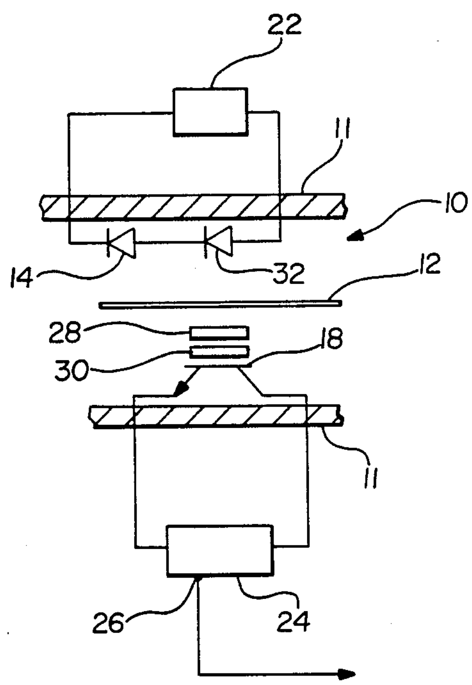
FIGS. 2 and 3 are schematic illustrations similar to FIG. 1 illustrating other embodiments of the invention.

Referring to FIG. 2 of the drawings, another embodiment of the detection apparatus is shown wherein parts similar or identical to those shown in FIG. 1 have been assigned like reference numbers. In this embodiment, an additional light emitting diode 32 is provided to increase the light intensity and to provide a broader more uniform light bean. This embodiment constitutes the preferred embodiment of the invention.

Figure 3:
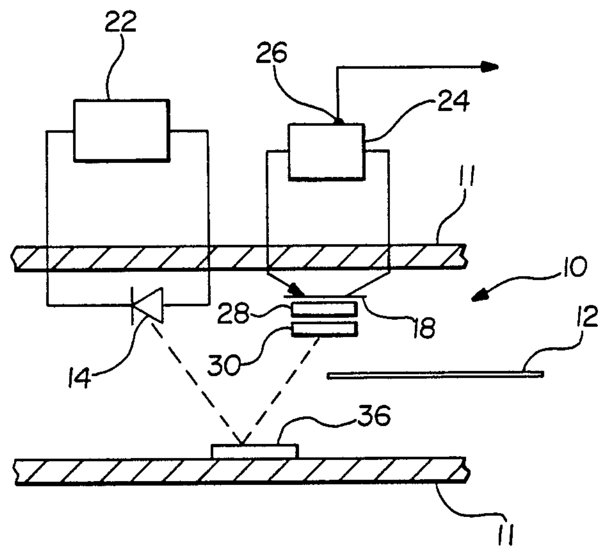

Still another embodiment of the invention is shown in FIG. 3, wherein parts similar or identical to those shown in FIG. 1 are also identified by like reference numerals. In this embodiment which functions in a reflective mode, the light sensitive transistor 18 is positioned on the same side of the film as the light emitting diode 14. A reflector 36 is positioned on the wall of the film chamber on opposite sides of the film from the diode 14 and transistor 18. In this embodiment when the film is not present in the slot 10, light will be transmitted from diode 14 to reflector 36 and reflected back to transistor 18 to render it conductive to produce a film absence signal at terminal 26. When the film is present in slot 10, the light emitted by diode 14 will be substantially absorbed by the dye in the film base and the transistor 18 will be in a non-conductive state.

It will be apparent that a reflective film detector can also be provided through use of a coaxial scanner of the type marketed by SCAN-A-MATIC Corp. With this scanner, the light emitting and light sensing elements are mounted coaxially in a single integrated unit which would be positioned in alignment with the reflector.

While the invention has been particularly shown and described with reference to several embodiments thereof, it will be understood by those skilled in the art that various changes may be made without departing from the scope of the invention as defined by the appended claims.

We claim:

1. Apparatus for detecting the presence of processed photographic film in a predetermined location comprising:

a light source for emitting light at a wavelength strongly absorbed by the film regardless of image density; and means positioned to receive the light emitted by said source when the film is not present at the location, the film absorbing the light when it is present at the location to prevent light from being received by said sensing means.

2. Apparatus as claimed in claim 1 wherein source emits light having a wavelength in the range of 420–600 nanometers.

3. Apparatus as claimed in claim 2 wherein said light source and said light sensitive means are positioned on opposite sides of the film whereby light emitted by said light source is absorbed by the film and not received by said light sensitive means when the film is present in the location.

4. Apparatus as claimed in claim 3 wherein said light source comprises at least one light emitting diode and said light sensing means comprises a light sensitive transistor.

5. Apparatus as claimed in claim 4 wherein said light source comprises at least two light emitting diodes.

6. Apparatus as claimed in claim 4 further including an infrared absorbing filter positioned in front of said light receiving transistor to absorb infrared light.

7. Apparatus as claimed in claim 6 further including a filter for transmitting only light having a wavelength corresponding to the light emitted by said light emitting diode, said filter being positioned in front of said light sensitive transistor.

8. Apparatus as claimed in claim 2 wherein said light source and said light sensitive means are positioned on the same side of the film and further including a reflector positioned on the opposite of the film for reflecting light emitted by said light source to said light receiving means when film is not present at the location.

9. Apparatus as claimed in claim 8 wherein said light source comprises at least one light emitting diode and said light sensing means comprises a light sensitive transistor.

10. Apparatus as claimed in claim 9 wherein said light source comprises at least two light emitting diodes.

11. Apparatus as claimed in claim 9 further including an infrared absorbing filter positioned in front of said light receiving transistor to absorb infrared light.

12. Apparatus as claimed in claim 11 further including a filter for transmitting only light having a wavelength corresponding to the light emitted by said light emitting diode, said filter being positioned in front of said light sensitive transistor.

* * * * *